United States Patent [19]

Cheung et al.

[11] Patent Number: 5,739,200
[45] Date of Patent: Apr. 14, 1998

[54] PLASTICIZIED α-OLEFIN/VINYLIDENE AROMATIC MONOMER OF HINDERED ALIPHATIC OR CYCLOALIPHATIC VINYLIDENE MONOMER INTERPOLYMERS

[75] Inventors: Yunwa W. Cheung, Lake Jackson; John J. Gathers, Pearland; Martin J. Guest, Lake Jackson, all of Tex.; James R. Bethea, Baton Rouge, La.

[73] Assignee: The Dow Chemical Company, Midland, Mich.

[21] Appl. No.: 767,609

[22] Filed: Dec. 17, 1996

[51] Int. Cl.⁶ .................................................. C08K 5/01
[52] U.S. Cl. .......................... 524/504; 428/412; 428/500; 524/115; 524/296; 524/513; 524/537; 525/107; 525/108
[58] Field of Search .................... 524/296, 297, 524/115, 504, 513, 537; 526/347; 525/107, 108; 428/412, 500

[56] References Cited

U.S. PATENT DOCUMENTS

| | | | |
|---|---|---|---|
| 3,228,896 | 1/1966 | Canterino et al. | 524/297 |
| 3,740,279 | 6/1973 | Levering et al. | 149/19 |
| 3,821,149 | 6/1974 | Makowski et al. | 260/30.6 R |
| 5,414,040 | 5/1995 | McKay et al. | 524/526 |
| 5,460,818 | 10/1995 | Park et al. | 426/415 |

OTHER PUBLICATIONS

Derwent Abstract 91–166077/23 (EP 430,538–A).
Derwent Abstract 95/201820/27 (EP 653,464–A2).
Derwent Abstract 95–280994/37 (JP 07–179,614–A).
Derwent Abstract 95–28116/37 (JP 07–179–847–A).
Derwent Abstract 95–289198/38 (JP 07–186,505–A).
Derwent Abstract 95–309200/40 (JP 07–207,036–A).
Derwent Abstract 96–036010 (JP 07–304,965–A).
Derwent Abstract 94/325153/41 (CA 2,097,457).
Derwent Abstract 89–055475/08 (EP 304,030–A).
Derwent Abstract 93–285115/36 (JP 05–200,892–A).

*Primary Examiner*—Melvyn I. Marquis
*Assistant Examiner*—D. Aylward

[57] ABSTRACT

Properties of interpolymers of α-olefin/vinylidene aromatic monomer are enhanced with plasticizers selected from phthalate esters, trimellitate esters, benzoates, aliphatic diesters, epoxy compounds, phosphate esters, glutarates, polymeric plasticizers (polyesters of glycols and aliphatic dicarboxylic acids) and oils. These plasticized interpolymers are useful in a wide range of applications including films, sheet, adhesives, sealants and molded parts.

12 Claims, No Drawings

PLASTICIZIED α-OLEFIN/VINYLIDENE AROMATIC MONOMER OF HINDERED ALIPHATIC OR CYCLOALIPHATIC VINYLIDENE MONOMER INTERPOLYMERS

BACKGROUND OF THE INVENTION

The present invention pertains to the modification of compositions containing interpolymers of α-olefin/vinylidene aromatic and/or hindered aliphatic and/or cycloaliphatic vinylidene monomer by the use of plasticizer.

The generic class of materials of α-olefin/hindered vinylidene monomer substantially random interpolymers, including materials such as α-olefin/vinyl aromatic monomer interpolymers, and their preparation, are known in the art, such as described in EP 416 815 A2. These materials offer a wide range of material structures and properties which makes them useful for varied applications, such as asphalt modifiers or as compatibilizers for blends of polyethylene and polystyrene, as described in U.S. Pat. No. 5,460,818.

The structure, thermal transitions and mechanical properties of substantially random interpolymers of ethylene and styrene containing up to about 50 mole percent styrene have been described (see Y. W. Cheung, M. J. Guest; Proc. Antec '96 pages 1634–1637). These polymers are found to have glass transitions in the range −20° C. to +35° C., and show no measurable crystallinity above about 25 mole percent styrene incorporation, i.e. they are essentially amorphous.

Although of utility in their own right, Industry is constantly seeking to improve the applicability of these interpolymers. To perform well in certain applications, these interpolymers could be desirably improved, for example, in the areas of processing characteristics or enhanced glass transition temperature depression or reduced modulus or reduced hardness or lower viscosity or improved ultimate elongation compared to a like property of the unmodified interpolymer. In relation to this invention, it is also considered advantageous to be able to engineer the glass transition process for the interpolymers to a particular temperature range, so that the energy absorbing capabilities of the polymer can be best utilized for example in sound and vibration damping.

This invention discloses the utility of plasticizers to achieve modification of the α-olefin/hindered vinylidene monomer substantially random interpolymers. There is a broad knowledge base on the plasticization of poly(vinyl chloride) (PVC), and it is generally known that many thermoplastics can be plasticized. Reference can be made for example to "Plasticizers" in "The Encyclopedia of Polymer Science and Engineering" (Supplement Volume; Wiley Interscience, 1989) regarding this type of technology. Depending upon the polymer type, typical plasticizer families include phosphoric acid derivatives, phthalic acid derivatives, trimellitate esters, benzoates, adipate esters, epoxy compounds, phosphate esters, glutarates and mineral oils. On the basis of their molecular weight, plasticizers are further classified as "monomeric" or "polymeric". In comparison with monomeric plasticizers, polymeric plasticizers generally tend to show higher permanence, lower compatibility, and lower plasticization efficiency. Plasticizers are also classed as "primary", and having high comparability with a particular polymer, or "secondary" if they have lower compatability. Mixtures of the various types of plasticizers can be employed to achieve cost/performance balances.

One well known effect of the addition of small amounts of plasticizer is that many polymers, including polystyrene, polycarbonate, and Nylon 66 exhibit "antiplasticization" in which significant increases in modulus and tensile strength and loss of toughness are observed. This effect is also found for PVC when plasticizers are utilized at relatively low concentrations of up to about 10–17 weight percent, depending on the plasticizer nature. Because of antiplasticization effects, compositions including less than about 20 parts per hundred of PVC are seldom encountered.

Based on the available background information, combinations of α-olefin/hindered vinylidene monomer substantially random interpolymers, and especially ethylene/styrene interpolymers, with typical plasticizers associated with PVC modification would not appear to offer an effective route to modify their performance. It is well-known that amorphous thermoplastic polymers, such as atactic polystyrene, will accept large amounts of plasticizers, and although they lower the glass transition temperature they rapidly form gums or liquids, i.e. they have no function as solid-state polymers. Addition of small (less than 3 weight percent) of dibutyl phthalate (DBP) has been used in latex formulations used for polish based on thermoplastics including polystyrene. The compatability of vinyl-type plasticizers with low density polyethylene (LDPE) is usually about 0 to 2 weight percent, although some hydrocarbons such as certain mineral oils may be compatible up to about 20 weight percent. U.S. Pat. No. 3,821,149 describing "Plasticized thermoplastic semi-crystalline block copolymers" teaches that random copolymers of ethylene and t-butyl styrene are non-crystalline, and when plasticized with 50 to 100 parts of dibutyl phthalate provides a product of little desirable physical properties. Random and statistical copolymers are specifically excluded from U.S. Pat. No. 3,821,149.

A further approach to consider regarding plasticization is the relative compatibility of the plasticizing molecule with the polymer. Reference to Buszard ("Theoretical Aspects of Plasticization" in "PVC Technology; Fourth Edition" ed. W. V. Titow, Applied Science Publishers 1984) outlines theoretical techniques for assessing the compatibility, and hence utility of plasticizers with PVC by the use of the solubility parameter. The matching of solubility parameters of polymer and effective plasticizers is one guide to defining nominal compatibility. Although there are some assumptions and limitations in adopting this approach, in general it is evident that effective plasticizers will have good compatibility or miscibility with the polymer. Reference to "Polymer Handbook" (Third edition, ed. J. Brandrup, E. H. Immergut, Wiley Interscience, 1989) gives the solubility parameter of PVC as around 19.8 $(MPa)^{0.5}$, and appropriate plasticizers have solubility parameters which fall between the limits of 17.2$(MPa)^{0.5}$ and 23.3$(MPa)^{0.5}$.

The reported solubility parameters of poly(ethylene) and poly(styrene) are 16.2$(MPa)^{0.5}$ and 18.6$(MPa)^{0.5}$ respectively. Based on group additivity theories, it is expected that substantially random copolymers of ethylene and styrene will have solubility parameters falling somewhere between these values.

It is not anticipated that interpolymers which are rich in ethylene would be effectively modified by many typical plasticizers used for vinyl modification, because of the differences in solubility parameters between polymer and plasticizer. Additionally, it is not anticipated that interpolymers which are relatively rich in styrene (~25–60 mole percent), and amorphous in nature, would be effectively modified by many typical plasticizers used for vinyl modification.

Based on the available background information, it would not be anticipated that α-olefin/hindered vinylidene monomer substantially random interpolymers, and especially ethylene/styrene interpolymers, would be effectively modified by many typical plasticizers associated with PVC modification, and particularly in the ranges of plasticizer incorporation described in this invention.

SUMMARY OF THE INVENTION

One aspect of the present invention pertains to a composition comprising (A) from about 50 to about 99 percent by weight of at least one substantially random interpolymer resulting from polymerizing a monomer composition comprising
  (1) from about 1 to about 65 mole percent of
    (a) at least one vinylidene aromatic monomer, or
    (b) at least one hindered aliphatic or cycloaliphatic vinylidene monomer, or
    (c) a combination of at least one aromatic vinylidene monomer and at least one hindered aliphatic or cycloaliphatic vinylidene monomer, and
  (2) from about 35 to about 99 mole percent of at least one $C_{2-20}$ α-olefin; and
B) from about 1 to about 50 percent by weight of at least one plasticizer selected from the group consisting of phthalate esters, trimellitate esters, benzoates, aliphatic diesters (including adipates azelates and sebacates), epoxy compounds, phosphate esters, glutarates, polymeric plasticizers (polyesters of glycols and aliphatic dicarboxylic acids) and oils.

Another aspect of the present invention pertains to such modified interpolymers in the form of a film or sheet, or as a component of a multilayered structure resulting from calendering, blowing, casting or (co)extrusion operations.

Another aspect of the present invention pertains to such modified interpolymers and their utility in the form of foams, fibers or emulsions.

Another aspect of the present invention pertains to the utilization of such modified interpolymers in adhesives, adhesive formulations and adhesive/sealant applications.

Another aspect of the present invention pertains to injection, compression, extruded or blow molded parts prepared from such modified interpolymers.

The compositions of the present invention can "comprise", "consist essentially of" or "consist of" any two or more of such polymers or interpolymers or plasticizers enumerated herein.

These compositions provide an improvement in one or more of the properties such as, but not limited to, processing characteristics or enhanced glass transition temperature depression or reduced modulus or reduced hardness or lower viscosity or improved ultimate elongation compared to a like property of the unmodified interpolymer.

DETAILED DESCRIPTION OF THE INVENTION

The term "interpolymer" is used herein to indicate a polymer wherein at least two different monomers are polymerized to make the interpolymer.

The term "copolymer" as employed herein means a polymer wherein at least two different monomers are polymerized to form the copolymer.

The term "substantially random" in the substantially random interpolymer comprising an α-olefin and a vinylidene aromatic monomer or hindered aliphatic or cycloaliphatic vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The interpolymers suitable for blending to make the blends comprising the present invention include, but are not limited to interpolymers prepared by polymerizing one or more α-olefins with one or more vinylidene aromatic monomers and/or one or more hindered aliphatic or cycloaliphatic vinylidene monomers.

Suitable α-olefins include for example, α-olefins containing from 2 to about 20, preferably from 2 to about 12, more preferably from 2 to about 8 carbon atoms. Particularly suitable are ethylene, propylene, butene-1, 4-methyl-1-pentene, hexene-1 and octene-1. These α-olefins do not contain an aromatic moiety.

Suitable vinylidene aromatic monomers which can be employed to prepare the interpolymers employed in the blends include, for example, those represented by the following formula:

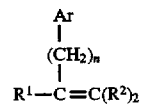

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinylidene compounds", it is meant addition polymerizable vinylidene monomers corresponding to the formula:

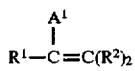

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from about 5 to about 65, preferably from about 5 to about 50, more preferably from about 10 to about 50 mole percent of at least one vinylidene aromatic monomer and/or hindered aliphatic or cycloaliphatic vinylidene monomer and from about 35 to about 95, preferably from about 50 to about 95, more preferably from about 50 to about 90 mole percent of at least one aliphatic α-olefin having from 2 to about 20 carbon atoms The number average molecular weight (Mn) of the polymers and interpolymers is usually greater than about 10,000, preferably from about 20,000 to about 1,000,000, more preferably from about 50,000 to about 500,000.

While preparing the substantially random interpolymer, an amount of atactic vinylidene aromatic homopolymer may be formed due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 pending (corresponding to EP-A-0,416,815) by James C. Stevens et al. and is allowed U.S. application Ser. No. 08/469,828 filed Jun. 6, 1995 all of which are incorporated herein by reference in their entirety. Preferred operating conditions for such polymerization reactions are pressures from atmospheric up to 3,000 atmospheres and temperatures from –30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 07/545,403, filed Jul. 3, 1990 pending corresponding to EP-A-416,815; U.S. application Ser. No. 07/702,475, filed May 20, 1991 abandoned corresponding to EP-A-514,828; U.S. application Ser. No. 07/876,268, filed May 1, 1992 allowed corresponding to EP-A-520,732; U.S. application Ser. No. 08/241,523, filed May 12, 1994 U.S. Pat. No. 5,470,993; as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635 and 5,556,928 all of which patents and applications are incorporated herein by reference in their entirety.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 pending by Francis J. Timmers et al. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from about −30° C. to about 250° C. in the presence of such catalysts as those represented by the formula

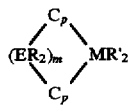

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

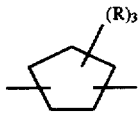

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl)) zirconium di-$C_{1-4}$ alkoxide, or any combination thereof and the like.

Further preparative methods for the interpolymer component (A) of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylenestyrene copolymer. Xu and Lin (*Polymer Preprints, Am.Chem.Soc., Div.Polym.Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiC_4/NdCl_3/MgCl_2/Al(Et)_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

Suitable modifiers which can be employed herein as the plasticizer component (B) include at least one plasticizer selected from the group consisting of phthalate esters, trimellitate esters, benzoates, aliphatic diesters (including adipates azelates and sebacates), epoxy compounds, phosphate esters, glutarates, polymeric plasticizers (polyesters of glycols and aliphatic dicarboxylic acids) and oils.

Particularly suitable phthalate esters include, for example, dialkyl $C_4$–$C_{18}$ phthalate esters such as diethyl, dibutyl phthalate, diisobutyl phthalate, butyl 2-ethylhexyl phthalate, dioctyl phthalate, diisooctyl phthalate, dinonyl phthalate, diisononyl phthalate, didecyl phthalate, diisodecyl phthalate, diundecyl phthalate, mixed aliphatic esters such as heptyl nonyl phthalate, di(n-hexyl, n-octyl, n-decyl) phthalate (P610), di(n-octyl, n-decyl) phthalate (P810), and aromatic phthalate esters such as diphenyl phthalate ester, or mixed aliphatic-aromatic esters such as benzyl butyl phthalate or any combination thereof and the like.

Particularly suitable trimellitate esters include, for example, tri(2-ethylhexyl) trimellitate, tri(heptyl, nonyl) trimellitate, tri isooctyl trimellitate, tri isodecyl trimellitate, tri (octyl, decyl) trimellitate.

Particularly suitable benzoates include, for example, diethylene glycol dibenzoate and dipropylene glycol dibenzoate.

Particularly suitable epoxy compounds include, for example, epoxidised vegetable oils such as epoxidised soyabean oil and epoxidised linseed oil.

Particularly suitable phosphate esters include, for example, triaryl, trialkyl, mixed alkyl aryl phosphates such as tributyl phosphate, trioctyl phosphate, tri(2-ethylhexyl) phosphate, tributoxyethyl phosphate, triphenyl phosphate, tricresyl phosphate, isopropylphenyl diphenyl phosphate, t-butylphenyl diphenyl phosphate, 2-ethylhexyl diphenyl phosphate and isodecyl diphenyl phosphate.

Particularly suitable oils include, for example, mineral oils, natural oils, naphthenic oils, paraffinic oils and aromatic oils.

The compositions of the present invention suitably comprise from about 50 to about 99, preferably from about 55 to about 95, more preferably from about 60 to about 90, percent by weight based on the combined weight of components (A) and (B) of the interpolymer(s) of α-olefin/vinylidene aromatic monomer and/or hindered aliphatic and/or cycloaliphatic vinylidene monomer as component (A); and from about 1 to about 50, preferably from about 5 to about 45, more preferably from about 10 to about 40, percent by weight based on the combined weight of components (A) and (B) of plasticizer(s) as component (B).

The compositions of the present invention may be prepared by any suitable means known in the art such as, but not limited to, dry blending in a pelletized form in the desired proportions followed by melt blending in a screw extruder, an internal batch mixer e.g. a Banbury mixer, a calender or a roll mill, or the like.

Additives such as antioxidants (e.g., hindered phenols such as, for example, IRGANOX™ 1010), phosphites (e.g., IRGAFOS® 168)), U. V. stabilizers, cling additives (e.g., PIB), antiblock additives, slip agents, colorants, pigments, fillers, and the like can also be included in the interpolymers employed in the blends of the present invention, to the extent that they do not interfere with the enhanced properties discovered by Applicants. Minor amounts, up to 50 percent by weight, of other polymers including polystyrene, syndiotactic polystyrene, styrenic copolymers such as styrene/ acrylonitrile, polyolefin homo and copolymers, polyethylene, polypropylene, poly(vinyl chloride), polycarbonate, polyethylene terephthalate, urethane polymers and polyphenylene oxide, can also be included in the interpolymers employed in the blends of the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from about 0.01 to about 10, preferably from about 0.05 to about 5, more preferably from about 0.1 to about 2 percent by weight based upon the weight of the polymer or polymer blend.

Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from about 0.05 to about 50, preferably from about 0.1 to about 35 more preferably from about 0.2 to about 20 percent by weight based upon the weight of the polymer or polymer blend. However, in the instance of fillers, they could be employed in amounts up to about 90 percent by weight based on the weight of the polymer or polymer blend.

The compositions of the present invention can be utilized to produce, but not limited to, a wide range of fabricated articles such as, for example, calendered sheet, blown films and injection molded parts, and the like. The compositions can also be used in the manufacture of fibers, foams and latices. The compositions of the present invention can also be utilized in adhesive and sealant formulations.

The following examples are illustrative of the invention, but are not to be construed as to limiting the scope of the invention in any manner.

Preparation of Interpolymers (A), (B), (C), and (D)

Polymer is prepared in a 400 gallon agitated semi-continuous batch reactor. The reaction mixture consisted of approximately 250 gallons a solvent comprising a mixture of cyclohexane (85 wt %) & isopentane (15 wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components: Titanium: (N-1, 1-dimethylethyl)-dimethyl(1-(1,2,3,4,5-eta)-2,3,4,5-tetramethyl-2,4-cyclopentadien-1-yl)silanaminato))(2-)N)-dimethyl, CAS# 135072-62-7, Tris(pentafluorophenyl) boron, CAS# 001109-15-5, Modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™ 1010 anti-oxidant is then added to the solution and the polymer is isolated from the solution. The resulting polymers are isolated from solution by either stripping with steam in a vessel or by use of a devolatilizing extruder. In the case of the steam stripped material, additional processing is required in extruder like equipment to reduce residual moisture and any unreacted styrene. Table 1 provides a summary of the process conditions used to produce the polymers, together with characterization data.

TABLE 1

| Sample Number | Solvent loaded | | Styrene loaded | | Pressure | | Temp. | Total $H_2$ Added | Run Time | Polym. in Solution |
|---|---|---|---|---|---|---|---|---|---|---|
| | lbs | kg | lbs | kg | Psig | kPa | °C. | Gms | Hrs | Wt. % |
| A | 252 | 114 | 1320 | 599 | 42 | 290 | 60 | 0 | 2.8 | 11.5 |
| B | 252 | 114 | 1320 | 599 | 40 | 276 | 60 | 23 | 6.5 | 18.0 |
| C | 842 | 382 | 662 | 300 | 105 | 724 | 60 | 8.8 | 3.7 | 8.6 |
| D | 1196 | 542 | 225 | 102 | 70 | 483 | 60 | 7.5 | 6.1 | 7.2 |

| Sample Number | Melt Index | Total Wt % Styrene in Polymer* | Talc Level Wt % | Isolation Method |
|---|---|---|---|---|
| A | 0.18 | 81.7 | <2.5 | Stm. Str. |
| B | 1.83 | 81.6 | <2.0 | Stm. Str. |
| C | 0.01 | 48.3 | <1.0 | Stm. Str. |
| D | 0.03 | 29.8 | 0 | Extruder |

*Styrene content measured by FTIR technique

Test parts and characterization data for the interpolymers and the blends are generated according to the following procedures:

Part Preparation and Testing Procedures

The plasticizers employed were: P610, a mixed linear dialkyl (hexyl, octyl, decyl) phthalate ester having a molecular weight(MW) of about 400 available from the C. P. Hall Co.; G57 is a "polymeric" (MW~5,700) glutarate available from the C. P. Hall Co. and Sunpar 2280, a paraffinic oil available from Sun Company. Inc. and having a molecular weight of 690 and a specific gravity at 60° F. of 0.8911.

Compression Molding

Samples were melted at 190° C. for 3 min. and compression molded at 190° C. under 20,000 lb (9,072 kg) of pressure for another 2 min. Subsequently, the molten materials were quenched in a press equilibrated at room temperature.

Differential Scanning Calorimetry (DSC)

A Dupont DSC-2210 was used to measure the thermal transition temperatures and heat of transition for the samples. In order to eliminate previous thermal history, samples were first heated to about 160° C. Heating and cooling curves were recorded at 10° C./min. Melting ($T_m$ from second heat) and crystallization ($T_c$) temperatures were recorded from the peak temperatures of the endotherm and exotherm, respectively.

Dynamic Mechanical Spectroscopy (DMS

Dynamic mechanical data were generated using a Rheometrics RSA-II solid state analyzer, and melt pressed (~20 mil (0.0508 cm) thick) film test specimens. The DMS measurements were conducted at a step rate of 5° C./min and a fixed frequency of 10 rad/sec. The glass transition temperature (Tg) of the samples was determined from the tan δ peak maximum.

Shear Rheology

Oscillatory shear rheology measurements were performed with a Rheometrics RMS-800 rheometer. Melt rheological properties were monitored at an isothermal set temperature of 190° C. in a frequency sweep mode, using parallel plate test geometry.

Mechanical Testing

Tensile properties of the compression molded samples were measured using an Instron 1145 tensile machine equipped with an extensiometer. ASTM-D638 samples were tested at a strain rate of 5 min$^{-1}$. Micro-tensile samples were tested at a speed of 5 in/min (12.7 cm/min) at −10° C. Average of four tensile measurements is given. The standard deviation for the ultimate properties is typically about 10% of the reported average value.

Tensile Stress Relaxation

Uniaxial tensile stress relaxation was evaluated using an Instron 1145 tensile machine. Compression molded film (~20 mil (0.0508 cm) thick) with a 1" (2.54 cm) gauge length was deformed to a strain level of 50% at a strain rate of 20 min$^{-1}$. The force required to maintain 50% elongation was monitored for 10 min. The magnitude of the stress relaxation is defined as (($f_i-f_f)/f_i$) where $f_i$ is the initial force and $f_f$ is the final force.

EXAMPLES 1 TO 6 AND COMPARATIVE EXPERIMENT A

Six blend compositions, examples 1, 2, 3, 4, 5 and 6, are prepared from interpolymer (A) above and either a mixed linear dialkyl (hexyl, octyl, decyl) phthalate ester (P610, available from the C.P.Hall Company, and having a molecular weight (MW) about 400) or mineral oil (Sunpar 2280, a paraffinic oil available from Sun Company. Inc. and having a molecular weight of 690 and a specific gravity at 60° F. of 0.8911) or polymeric glutarate (G57 available from the C.P.Hall Company) in weight ratios given in Table 2 with a Haake mixer equipped with a Rheomix 3000 bowl. About 180 grams of the dry blended component materials were fed into the mixer equilibrated at 150° C. Feeding and temperature equilibration took about 3–5 minutes. The molten material was mixed at 150° C. and 40 rpm for 10 minutes.

The characterization data for the examples and the component interpolymer are given in Table 2. It was possible to modify the interpolymers, and produce materials with structural integrity and good mechanical properties.

Analysis of examples 4 and 5 of modification with the P610 phthalate ester shows the good plasticization achieved. There is no significant broadening of the Tan δ of the loss peak associated with the interpolymer glass transition process. These modified interpolymers show good low temperature performance, and significant retention of stress relaxation behavior. The level of hardness can be controlled by appropriate selection of plasticizer. The combination of mechanical properties, relaxation behavior, hardness and processability is particularly desirable, for example in many film applications.

TABLE 2

| | Example or Comparative Experiment | | | | | | |
|---|---|---|---|---|---|---|---|
| | A* | 1 | 2 | 3 | 4 | 5 | 6 |
| Wt ratio Interpolymer (A)**/Mineral oil | 100/0 | 95/5 | 90/10 | 80/20 | | | |
| Wt ratio Interpolymer (A)/ P610 plasticizer | | | | | 90/10 | 80/20 | |
| Wt ratio Interpolymer (A)/ G57 glutarate | | | | | | | 90/10 |
| Tg (DMS), °C. | 30 | 22 | 22 | 21 | 7 | 4.5 | 24 |
| Tan δ peak width at half height deg. C. | 16 | | | | | 15 | |
| Mechanical Properties (@ 23° C.) | | | | | | | |
| Tensile Mod, MPa | 617.6 | 6.4 | 6.8 | 6.3 | 2.4 | 0.94 | 7.4 |
| % Strain @ Break | 257 | 313 | 290 | 310 | 370 | 546 | 273 |
| Total energy @ Break, N.m | 122.4 | | | | | 21.6 | |
| Mechanical Properties (@ −10° C.) | | | | | | | |
| Tensile Mod, MPa | | | | | | | |
| % Strain @ Break | 18.6 | | | | | 281 | |
| Total energy @ Break, N.m | 9.9 | | | | | 145.6 | |
| % Stress Relaxation (@ 23° C.) | 92.9 | | | | | 68.7 | |

TABLE 2-continued

| | Example or Comparative Experiment | | | | | | |
|---|---|---|---|---|---|---|---|
| | A* | 1 | 2 | 3 | 4 | 5 | 6 |
| Hardness: Shore A (@ 23° C.) | 96 | 95 | 92 | 92 | 66 | 49 | 96 |
| Melt Rheology (190° C.) | | | | | | | |
| $10^5\eta$ (0.1 rad/sec), Poise | 6.53 | | | | | 0.17 | |
| η (100/0.1) | 0.048 | | | | | 0.11 | |
| Tan δ (0.1 rad/sec) | 4.42 | | | | | 10.2 | |

*Not an example of the present invention.
**Interpolymer (A) is an ethylene/styrene interpolymer containing 69.4 weight percent (37.9 mole percent) styrene (measured by NMR technique), having an $I_2$ melt flow index of 0.18 and containing 8.4 weight percent atactic polystyrene. The polymer showed no measurable crystallinity by DSC techniques.

As a further comparative experiment, a blend of polystyrene (PS; Styron™ 685D, a polystyrene having a Melt Flow Index (200° C./5.0 kg) of 1.5 g/10 min and a specific gravity of 1.04, commercially available from The Dow Chemical Company) and P610 plasticizer was produced in a PS/P610 weight ratio of 80/20. This produced a material which had a Tg of 37° C. compared to 106° C. for the unmodified PS. No properties could be measured due to the form of this composition, confirming past experience that phthalate esters do not function as effective plasticizers in PS.

EXAMPLES 7 & 8 and COMPARATIVE EXPERIMENT B

Two blend compositions, examples 7 and 8, are prepared from interpolymer (B) above and a mixed linear dialkyl (hexyl, octyl, decyl) phthalate ester (P610, available from the C.P.Hall Company, and having a molecular weight (MW) about 400) in weight ratios given in Table 3 with a Haake mixer equipped with a Rheomix 3000 bowl. About 180 grams of the dry blended component materials were fed into the mixer equilibrated at 150° C. Feeding and temperature equilibration took about 3–5 minutes. The molten material was mixed at 150° C. and 40 rpm for 10 minutes.

The characterization data for the examples and the component Interpolymer are given in Table 3. It was possible to modify the interpolymers, and produce materials with structural integrity and good mechanical properties.

Analysis of examples 7 and 8 of modification with the P610 phthalate ester shows the good plasticization achieved. There is no significant broadening of the Tan δ of the loss peak associated with the interpolymer glass transition process. These modified interpolymers show good low temperature performance, and surprising retention of stress relaxation behavior. The combination of mechanical properties, relaxation behavior, hardness and processability is particularly desirable, for example in many film applications.

TABLE 3

| | Example or Comparative Experiment | | |
|---|---|---|---|
| | B* | 7 | 8 |
| Wt ratio Interpolymer (B)**/P610 plasticizer | | 80/20 | 70/30 |
| Tg (DMS), °C. | 29.8 | 7.5 | −10.8 |
| Tanδ peak width at half height deg. C. | 15 | 18 | 17 |
| Mechanical Properties (@ 23° C.) | | | |
| Tensile Mod, Mpa | 617.6 | 1.7 | 0.6 |
| % Strain @ Break | 248 | 587 | 320 |
| Total energy @ Break, N.m | 101.4 | 8.7 | 1.4 |
| Mechanical Properties (@ −10° C.) | | | |
| Tensile Mod, Mpa | | | |
| % Strain @ Break | 5.7 | 249 | 403 |
| Total energy @ Break, N.m | 9.9 | 100 | 32.1 |
| % Stress Relaxation (@ 23° C.) | 93.5 | 78.5 | 90.7 |
| Hardness: Shore A (@ 23° C.) | 98 | 37 | 21 |
| Melt Rheology (190° C.) | | | |
| $10^5\eta$ (0.1 rad/sec), Poise | 1.01 | 0.19 | 0.082 |
| η (100/0.1) | 0.14 | 0.29 | 0.36 |
| Tan δ (0.1 rad/sec) | 9.98 | 21.0 | 25.3 |

*Not an example of the present invention.
**Interpolymer (B) is an ethylene/styrene interpolymer containing 69.9 weight percent (38.4 mole percent) styrene (measured by NMR technique), having an $I_2$ melt flow index of 1.83 and containing 8.2 weight percent atactic polystyrene. The polymer shows no measurable crystallinity by DSC techniques.

EXAMPLE 9 and COMPARATIVE EXPERIMENT C

Example 9 is prepared from interpolymer (C) above and a mixed linear dialkyl (hexyl, octyl, decyl) phthalate ester (P610, available from the C.P.Hall Company, and having a molecular weight (MW) about 400) in weight ratios given in Table 4 with a Haake mixer equipped with a Rheomix 3000 bowl. About 180 gram of the dry blended component materials were fed into the mixer equilibrated at 150° C. Feeding and temperature equilibration takes about 3–5 minutes. The molten material is mixed at 150° C. and 40 rpm for 10 minutes.

The characterization data for the example and the component Interpolymer are given in Table 4. The modified interpolymers has structural integrity and good mechanical properties. The solid materials shows increased crystallinity compared to the unmodified interpolymer. There is some broadening of the Tan δ of the loss peak associated with the interpolymer glass transition process, which could find utility in some energy absorbing applications. The modified interpolymers show good low temperature performance, and retention of stress relaxation behavior. The combination of mechanical properties, relaxation behavior, hardness and processability is again desirable, for example in many film applications.

TABLE 4

| | Example or Comparative Experiment | |
|---|---|---|
| | C* | 9 |
| Wt ratio Interpolymer (C) **/P610 plasticizer | | 80/20 |
| DSC data | | |
| Percent crystallinity | 4.7 | 10.5 |
| Tm °C. | 45.7 | 44.8 |
| Tg (DMS), °C. | −2.2 | −21.7 |
| Tan δ peak width at half height deg. C. | 15 | 22 |
| Mechanical Properties (@ 23° C.) | | |
| Tensile Mod, Mpa | 6.8 | 4.1 |
| % Strain @ Break | 475 | 557 |
| Total energy @ Break, N.m | 105.6 | 65.2 |
| Mechanical Properties (@ −10° C.) | | |
| Tensile Mod, Mpa | 81.9 | 8.8 |
| % Strain @ Break | 258 | 480 |
| Total energy @ Break, N.m | 79.2 | 160.7 |
| % Stress Relaxation (@ 23° C.) | 26.2 | 29.6 |
| Hardness: Shore A (@ 23° C.) | 75 | 52 |
| Melt Rheology (190° C.) | | |
| $10^5\eta$ (0.1 rad/sec), Poise | 31 | 0.094 |
| η (100/0.1) | — | — |
| Tan δ (0.1 rad/sec) | 4.2 | 2.1 |

*Not an example of the present invention.
*Interpolymer (C) is an ethylene/styrene interpolymer containing 47.3 weight percent (19.5 mole percent) styrene, having an $I_2$ melt flow index of 0.01 and containing 3.7 weight percent atactic polystyrene.

EXAMPLES 10 & 11 AND COMPARATIVE EXPERIMENT D

Two blend compositions, examples 10 and 11, are prepared from interpolymer (D) above and either a mixed linear dialkyl (hexyl, octyl, decyl) phthalate ester (P610, available from the C.P.Hall Company, and having a molecular weight (MW) about 400) or mineral oil (Sunpar 2280, a paraffinic oil available from Sun Company, Inc. and having a molecular weight of 690 and a specific gravity at 60° F. of 0.8911) in weight ratios given in Table 5 with a Haake mixer equipped with a Rheomix 3000 bowl. About 180 gram of the dry blended component materials were fed into the mixer equilibrated at 150° C. Feeding and temperature equilibration takes about 3–5 minutes. The molten material is mixed at 150° C. and 40 rpm for 10 minutes.

The characterization data for the examples and the component Interpolymer are given in Table 5. The modified interpolymers have structural integrity and good mechanical properties.

The oil is a more effective modifier for lowering Tg in this Interpolymer compared to Interpolymer (A).

The solid materials show small changes in level of crystallinity compared to the unmodified interpolymer. Both modifiers produce broadening of the Tan δ of the loss peak associated with the interpolymer glass transition process, which could find utility in some energy absorbing applications.

The modified interpolymers show good low temperature performance, and retention of stress relaxation behavior. The processability is much altered, particularly the viscosity, and this translates into improved processability in some applications.

TABLE 5

| | Example or Comparative Experiment | | |
|---|---|---|---|
| | D* | 10 | 11 |
| Wt ratio Interpolymer (D**)/Mineral oil | | 80/20 | |
| Wt ratio Interpolymer (D)/P610 plasticizer | | | 80/20 |
| Percent crystallinity (DSC data) | 14.7 | 20.7 | 17.8 |
| Tm °C. (DSC data) | 71.3 | 69.7 | 70.4 |
| Tg (DMS), °C. | −8 | −14.5 | −25.4 |
| Tanδ peak width at half height deg. C. | 23 | 34 | 39 |
| Mechanical Properties (@ 23° C.) | | | |
| Tensile Mod, MPa | 19.7 | 2.1 | 12.6 |
| % Strain @ Break | 378 | 396 | 493 |
| Total energy @ Break, N.m | 150 | 82.7 | 65.2 |
| Mechanical Properties (@ −10° C.) | | | |
| Tensile Mod, MPa | 66.6 | 2.0 | 27.2 |
| % Strain @ Break | 303 | 403 | 484 |
| Total energy @ Break, N.m | 91.0 | 32.1 | 148 |
| % Stress Relaxation (@ 23° C.) | 26.2 | 26.1 | 26.3 |
| Hardness: Shore A (@ 23° C.) | 96 | 92 | 49 |
| Melt Rheology (190° C.) | | | |
| $10^5\eta$ (0.1 rad/sec), Poise | 16.6 | 0.43 | 0.43 |
| η (100/0.1) | 0.16 | 0.19 | 0.20 |
| Tan δ (0.1 rad/sec) | 2.37 | 2.7 | 2.6 |

*Not an example of the present invention.
**Interpolymer (D) is an ethylene/styrene interpolymer containing 29.3 weight percent (10 mole percent) styrene, having an $I_2$ melt flow index of 0.03 and containing 1 weight percent atactic polystyrene.

We claim:
1. A composition comprising
   (A) from about 50 to about 99 percent by weight of at least one substantially random interpolymer comprising
      (1) from about 5 to about 65 mole percent of polymer units derived from
         (a) at least one vinylidene aromatic monomer, or
         (b) at least one hindered aliphatic or cycloaliphatic vinylidene monomer, or
         (c) a combination of at least one aromatic vinylidene monomer and at least one hindered aliphatic or cycloaliphatic vinylidene monomer, and
      (2) from about 35 to about 95 mole percent of polymer units derived from at least one $C_{2-20}$ α-olefin; and
   (B) from about 1 to about 50 percent by weight of at least one plasticizer selected from the group consisting of phthalate esters, trimellitate esters, benzoates, aliphatic diesters, epoxy compounds, phosphate esters, glutarates, polymeric plasticizers (polyesters of glycols and aliphatic dicarboxylic acids) and oils.
2. A composition of claim 1 wherein
   component (A) comprises from about 5 to about 50 mole percent of polymer units derived from at least one aromatic vinylidene monomer and from about 50 to about 95 mole percent of polymer units derived from at least one $C_{2-10}$ α-olefin.
3. A composition of claim 1 wherein
   component (A) comprises from about 5 to about 50 mole percent of polymer units derived from styrene and from about 50 to about 95 mole percent of polymer units derived from ethylene, or a combination of ethylene and at least one $C_{3-10}$ α-olefin.
4. A composition of claim 1 comprising
   (A) from about 60 to about 95 percent by weight of at least one substantially random interpolymer comprising

(1) from about 5 to about 50 mole percent of polymer units derived from at least one vinylidene aromatic monomer, and, (2) from about 50 to about 95 mole percent of polymer units derived from ethylene, or a combination of ethylene and at least one $C_{3-10}$ α-olefin; and (B) from about 5 to about 40 percent by weight of at least one plasticizer selected from the group consisting of phthalate esters, trimellitate esters, benzoates, aliphatic diesters, epoxy compounds, phosphate esters, glutarates, polymeric plasticizers (polyesters of glycols and aliphatic dicarboxylic acids) and oils.

5. A composition of claim 1 comprising (A) from about 60 to about 95 percent by weight of at least one substantially random interpolymer comprising (1) from about 5 to about 50 mole percent of polymer units derived from styrene, and, (2) from about 50 to about 95 mole percent of polymer units derived from ethylene, or a combination of ethylene and at least one $C_{3-10}$ α-olefin (B) from about 5 to about 40 percent by weight of at least one plasticizer selected from the group consisting of phthalate esters, trimellitate esters, benzoates, aliphatic diesters, epoxy compounds, phosphate esters, glutarates, polymeric plasticizers (polyesters of glycols and aliphatic dicarboxylic acids) and oils.

6. A composition of claim 1 comprising (A) from about 60 to about 95 percent by weight of at least one substantially random interpolymer comprising (1) from about 5 to about 50 mole percent of polymer units derived from styrene, and, (2) from about 50 to about 95 mole percent of polymer units derived from ethylene, or a combination of ethylene and at least one $C_{3-10}$ α-olefin (B) from about 5 to about 40 percent by weight of at least one plasticizer selected from the group consisting of phthalate esters, including dialkyl, mixed linear dialkyl, aryl and mixed alkyl aryl esters.

7. A composition of claim 1 comprising (A) from about 60 to about 95 percent by weight of at least one substantially random interpolymer comprising (1) from about 5 to about 50 mole percent of polymer units derived from styrene, and (2) from about 50 to about 95 mole percent of polymer units derived from ethylene, or a combination of ethylene and at least one $C_{3-10}$ α-olefin (B) from about 5 to about 40 percent by weight of at least one oil selected from mineral oils, natural oils, naphthenic oils, paraffinic oils and aromatic oils.

8. A composition of claim 1 containing about 1 to about 50 weight percent of one or more additional polymers selected from polystyrene, syndiotactic polystyrene, styrenic copolymers such as styrene/acrylonitrile copolymer, polyolefin homo and copolymers, polyethylene, polypropylene, poly(vinyl chloride), polycarbonate, polyethylene terephthalate, urethane polymers and polyphenylene oxide.

9. A composition of claim 1 in the form of foams, fibers or emulsions.

10. A composition of claim 1 in the form of an adhesive or sealant compositions.

11. A composition of claim 1 in the form of injection, compression, extruded or blow molded parts.

12. A composition of claim 1 in the form of a film or sheet, or as a component of a multilayered structure resulting from calendering, blowing, casting or (co-)extrusion operations.

* * * * *